United States Patent [19]

Higgins

[11] 4,389,356

[45] Jun. 21, 1983

[54] SULFUR PRILLING

[75] Inventor: John T. Higgins, Ladysmith, Canada

[73] Assignee: Cominco Ltd., Vancouver, Canada

[21] Appl. No.: 388,394

[22] Filed: Jun. 14, 1982

Related U.S. Application Data

[63] Continuation-in-part of Ser. No. 283,319, Jul. 13, 1981, abandoned.

[30] Foreign Application Priority Data

Apr. 29, 1982 [CA] Canada .................................. 381261

[51] Int. Cl.$^3$ ................................................ B01J 2/04
[52] U.S. Cl. ......................................... 264/9; 264/13; 264/14
[58] Field of Search ............................... 264/9, 13, 14

[56] References Cited

U.S. PATENT DOCUMENTS

| | | | |
|---|---|---|---|
| 2,968,833 | 1/1961 | De Haven et al. ..................... | 264/9 |
| 3,390,835 | 7/1968 | Harris ..................................... | 264/9 |
| 3,504,061 | 3/1970 | Elliott .................................... | 264/9 |
| 4,238,429 | 12/1980 | Sasaki et al. .......................... | 264/14 |

*Primary Examiner*—James R. Hall
*Attorney, Agent, or Firm*—Arne I. Fors; Robert F. Delbridge

[57] ABSTRACT

In the processes for the production of solid particulate sulfur by prilling or granulation, wherein molten sulfur emanates from a spray means, such as a prilling device or spray nozzle, interruptions occur in the flow of sulfur from the spray means. The uneven flow of molten sulfur from a spray means can be substantially eliminated by applying vibration to the spray means, preferably in the diection of flow of molten sulfur through the spray means, at a low frequency in the range of 0.2 to 30 cycles per second. The molten sulfur emanating from the spray means is at a temperature of at least one Celsius degree above the melting temperature of sulfur and under a pressure of at least 250 Pa. The flow rate of sulfur from the spray means is uniform and steady, the particulate sulfur product is hard and closely sized, and the emission of sulfur fines discharging from the process is reduced.

19 Claims, No Drawings

SULFUR PRILLING

This application is a continuation-in-part of application Ser. No. 283,319 filed July 13, 1981, now abandoned.

BACKGROUND OF THE INVENTION

This invention relates to a process for the production of particulate sulfur and, more particularly, relates to a method for reducing interruption in the flow of molten sulfur from spray means in the prilling and granulation of sulfur.

Sulfur is recovered in large quantities from sulfur deposits, usually as Frasch sulfur, and from natural gas, usually by the Claus Process. The recovered sulfur is often processed into suitable forms for the market either directly from the recovery process or from impounded areas if the sulfur is stored in solid form in impounded areas at plant sites. Suitable forms of elemental sulfur are slab sulfur or particulate sulfur such as slate, flakes, pellets, granules and prills.

The prior art discloses a number of processes for the production of particulate sulfur, such as by prilling or granulation. A review of these processes, which are used on a commercial scale or are now being developed in the sulfur industry, is published in Sulphur No. 142, May, June, 1979, pages 30–39. More specifically, the prilling of sulfur in a liquid has been disclosed, for example, in U.S. Pat. No. 3,504,061, H. J. Elliott, Mar. 31, 1970. Granulation processes for sulfur have been disclosed in U.S. Pat. No. 3,231,413, Y. F. Berquin, Jan. 25, 1966, according to which sulfur is granulated in a spouted, fluidized bed, and in U.S. Pat. Nos. 3,936,534 A. H. Schallis, Feb. 3, 1976, 4,234,318, J. T. Higgins, et al, Nov. 18, 1980, and 4,272,234, S. Y. H. Tse, June 9, 1981, according to which molten sulfur is sprayed from one or more nozzles onto solid particles of sulfur in a rotating drum. In all these processes, molten sulfur is directed through means having one or more orifices from which the molten sulfur emanates in a flow of droplets or as a spray.

I have observed that the processes for production of particulate sulfur, particularly from Claus Process sulfur, suffer from interruptions in the flow of molten sulfur emanating from spray means such as spray nozzles and prilling devices, and produce a relatively large amount of undesirable fines. The flow interruptions interfere with the continuity of the process, while fine sulfur particles formed during the process are difficult to handle and control, and are often discharged from the process as an undesirable emission. In addition, in the prilling of sulfur in a countercurrent flow of air, undesirable fines discharge partly with the prills and partly with discharged cooling air, to make the prilled product less uniform in size necessitating screening and remelting of the fines for recycling, and to cause undesirable and visible sulfur emission.

STATEMENT OF INVENTION

I have now found that in processes for producing particulate sulfur by prilling or granulation, the disadvantages of flow interruptions and the formation of very fine particles can be alleviated and that sulfur emission from the process can be substantially obviated. I have also found that a more closely sized sulfur product consisting of uniformly sized, hard, spherical sulfur particles can be obtained. More particularly, I have discovered that by applying a low frequency vibration or rapping to the spray means from which liquid sulfur emanates, interruptions in the flow of sulfur from the spray means are substantially alleviated and the formation of fine solid sulfur particles is minimized, whereby sulfur emission from the process is substantially eliminated and a more closely sized sulfur product is obtained.

Accordingly, there is provided a process for the manufacture of particulate sulfur wherein molten sulfur is fed to spray means from which said molten sulfur emanates as a spray of molten sulfur, and said spray is formed into particulate solid sulfur, said process comprising feeding molten sulfur to said spray means at a temperature at least one Celcius degree above the melting temperature of sulfur, said spray means having at least one orifice; forming a spray of molten sulfur at said orifice; vibrating said spray means at a frequency in the range of about 0.2 to 30 cycles per second; forming said spray of molten sulfur into hard, spherical particulate sulfur in a current of cooling gas; and recovering said particulate sulfur; whereby the flow of molten sulfur through the orifice is maintained at a uniform, steady rate of flow.

According to a first preferred embodiment, there is provided a process for the prilling of sulfur wherein molten sulfur is fed to a prilling device at the top of a prilling tower, droplets of molten sulfur emanating from the prilling device are solidified in a rising stream of cooling air and solidified sulfur droplets are discharged from the tower, said process comprising feeding molten sulfur at a temperature in the range of from about one to about seven Celcius degrees above the melting temperature of sulfur to said prilling device, said prilling device having at least one orifice; forming drops of molten sulfur at said orifice; vibrating said prilling device at a frequency in the range of about 0.2 to 30 cycles per second; solidifying said drops of molten sulfur in said rising stream of cooling air in the form of hard, spherical, uniformly sized sulfur prills; discharging said sulfur prills from the bottom of the tower; and discharging cooling air from the top of the tower; whereby the flow of molten sulfur through the orifice is maintained at a uniform, steady rate of flow and the formation of fine droplets smaller than said drops is substantially obviated such that the amount of solidified fine droplets contained with the discharged sulfur prills and the emission of solidified fine droplets of sulfur entrained with the discharging cooling air are substantially reduced.

In this first preferred embodiment, preferably, the temperature of the molten sulfur and the prilling device are maintained in the range of about 120° to 125° C., the spray pressure is in the range of about 250 to 1000 Pa, and the prilling device is vibrated at a frequency in the range of about 0.5 to 10 cycles per second in the direction of the flow of molten sulfur through the orifice.

The spray means, including a prilling device, or a spray nozzle, preferably are vibrated in the direction of flow of molten sulfur through the orifice for the production of particulate sulfur by either prilling or granulation.

The cooling gas may be air, a substantially inert gas or a mixture of gases containing not more than about 8% oxygen, by volume.

According to a second preferred embodiment of the process of the invention, there is provided a process for the production of granular sulfur which comprises forming a bed of moving solid particles of sulfur; spraying molten sulfur from a spray means having at least one orifice at a temperature of from about 1 to about 40 Celcius degrees above the melting temperature of sulfur and at a spray pressure of at least 100 kPa onto said bed and into a continuously falling curtain of said solid particles; simultaneously contacting the continuously falling curtain of solid particles with a current of cooling air; and vibrating said spray means at a frequency in the range of about 0.2 to 30 cycles per second, such that vibration is imparted in the direction of the flow of molten sulfur through said orifice; whereby the flow of molten sulfur through said spray means is maintained at a uniform, steady rate of flow.

In this second preferred embodiment, preferably, the temperature of the molten sulfur is from about 5 to 30 Celsius degrees above the melting temperature of sulfur, the spray pressure is in the range of about 100 to 400 kPa, and the spray means is vibrated at a frequency in the range of about 0.5 to 10 cycles per second.

DETAILED DESCRIPTION OF THE INVENTION

In the processes for the production of particulate sulfur from molten sulfur, molten sulfur is obtained directly from a sulfur recovery process, such as the Claus Process, or from solid sulfur melted in a suitable vessel. Molten sulfur is passed from a source of molten sulfur to a spray means having at least one orifice from which the molten sulfur emanates as a series of droplets of molten sulfur or as a spray.

The flow of sulfur from the spray means is regulated by carefully controlling the pressure at the spray means and the temperature of the molten sulfur passing through the spray means. The values of the pressure and the temperature depend on the type of process used, i.e., whether particulate sulfur is produced by prilling or by granulation.

The spray pressure can be as low as 250 Pa or as high as 4000 kPa, while the temperature must be at least one Celcius degree above the melting temperature of sulfur, which is usually in the range of 113° to 120° C.

The spray means are of a suitable design such as conventionally used in prilling and granulation processes of fertilizer materials such as, for example, urea and ammonium nitrate. Thus the spray means can be a prilling device such as a prilling cup or basket having at least one orifice, preferably a multiplicity of orifices, or can comprise one or more spray nozzles each mounted on a spray head attached to a spray header. I have found when drops of sprays of molten Claus Process sulfur emanate from an orifice in the spray means that interruptions occur in the flow of sulfur resulting in an uneven rate of flow and that a portion of sulfur forms very small droplets, which upon cooling, form undesirable fines or dust. These very fine particles of sulfur tend to pass through the process and become entrained in the cooling gas used in the process. These entrained very fine particles are very difficult to remove from the cooling gas and, as a result, will discharge from the process as a visible emission.

Without being bound by theoretical considerations, it is believed that the flow interruptions and the formation of fine droplets may be caused by the presence of sulfur polymers in Claus Process sulfur. This may cause partial plugging of the orifices and result in atomization of sulfur, or may cause adherence of a small amount of liquid sulfur to the trailing edges of the orifices which intermittently separates from the edges to form fine droplets. Other causes may be an instability of the drops and/or the viscosity of the molten sulfur which create interruptions in the steady state of flow of sulfur through the orifice.

I have unexpectedly discovered that when the spray means is rapped, impacted or vibrated, referred to as vibrating hereafter, at a low frequency, the flow of molten sulfur through the orifices can be maintained essentially without interruption at a uniform, steady rate and the formation of fine droplets of sulfur is substantially reduced.

The means for vibrating must be such that no interference occurs with the formation of the drops or sprays of sulfur. The frequency of vibrating should be low enough to prevent any such interference and, preferably, prevent any atomization of sulfur. I have found that when the frequency is in the range of about 0.2 to 30 cycles per second, i.e. from one rap or impact per 5 seconds to 30 raps or impacts per second, the formation of sulfur fines is effectively reduced. Preferably, the frequency of vibrating is in the range of 0.5 to 10 cycles per second.

The means for vibrating can be any suitable means known in the art. The vibrating means is chosen such that its mass is proportional to the mass of the spray means and its contents. Preferably, the vibration is applied in the direction of the flow of sulfur through the orifice in the spray means. The vibrating means is mounted in a suitable position on the spray means and on or close to the orifice from which molten sulfur emanates.

The preferred embodiments of the process will now be described in detail with specific reference to a prilling process and a granulation process.

SULFUR PRILLING

In the prilling of sulfur, molten sulfur is passed to at least one prilling device positioned in the top of a prilling tower. The pressure of the molten sulfur at the prilling device is maintained at a low value, preferably by pumping molten sulfur to a constant head tank at the top of the tower, from which tank the molten sulfur flows to the prilling device by gravity. Preferably, the pressure of the molten sulfur at the prilling device is in the range of about 250Pa to 1000Pa (1-4" $H_2O$).

The temperature of the molten sulfur passed to the prilling device and the temperature of the prilling device must be carefully controlled. In order to obtain hard spherical sulfur prills which are resistant to attrition, the temperature of the sulfur drops which emanate from the prilling device must be close to the melting temperature of sulfur. A low superheat of the molten sulfur that is being prilled also decreases the formation of fines and reduces emission of sulfur with cooling air discharging from the tower. The temperature of the molten sulfur passed to the prilling device is at a value in the range of about one to seven Celcius degrees above the melting temperature of the sulfur. Preferably, the temperature of both the prilling device and molten sulfur is controlled in the range of about 120° to 125° C.

The prilling device is preferably a prilling cup or basket which is mounted in a stationary position in the top of the tower. The prilling cup or basket of a vertical cylindrical wall and a flat bottom containing at least one orifice, preferably a multiplicity of orifices. The size and shape of the orifices are such that drops of sulfur are formed substantially in the size range desired for the sulfur prills. Molten sulfur is fed to the prilling device and drops of molten sulfur emanate into the tower from the orifices. The prilling device is heated by suitable means, such as for example, by means of a steam jacket, to the desired temperature, for example, one to two Celcius degrees higher than the temperature of the molten sulfur.

Suitable vibrating means is mounted in a suitable position on the side or top of the prilling device. The prilling device is vibrated with a frequency in the range of about 0.2 to 30, preferably 0.5 to 10 cycles per second.

When using the preferred vibrating means mounted on the prilling device which vibrates the device with a frequency in the range of 0.5 to 10 cycles per second, and feeding molten sulfur to the prilling device at the preferred temperature in the range of from about 120° to 125° C., the emission of sulfur with the cooling air discharging from the top of the prilling tower is essentially eliminated and the amount of sulfur fines is substantially reduced. In addition, the sulfur prills formed in the desired size range are substantially spherical and hard.

The following comparative examples illustrate the invention in a prilling process.

EXAMPLE 1

Claus Process sulfur was prilled conventionally, without applying vibration to the prilling device. Claus Process sulfur was melted in a constant head tank positioned at the top of a 20 m high prilling tower. Molten sulfur at a temperature of 121° C. was passed from the head tank by gravity at a rate of 540 L/h to a standard prilling basket maintained at a temperature of 122° C. Molten sulfur emanated as drops from 96 orifices in the basket and the sulfur drops fell into a rising stream of cooling air. Cooling air was fed into the bottom of the tower at a rate of 129,000 m$^3$/h and a temperature of 32° C. The cooling air velocity in the tower was 6 m/sec. During operation, large amounts of sulfur fines were discharged from the top of the tower as a visible emission and an extremely large amount of fines (27.0%–20 mesh Tyler Screen Series) accompanied the sulfur prills. The operation had to be terminated because of reductions and intermittent interruptions in the flow of molten sulfur caused by partial plugging of the orifices in the prilling device.

EXAMPLE 2

Claus Process sulfur was prilled using the same conditions as in Example 1, but a vibrator was attached to the top of the prilling basket and the basket was vibrated with a frequency of 8.6 cycles per second. No interruptions in the flow of molten sulfur were observed and operation was continuously maintained. The sulfur recovered from the bottom of the prilling tower was subjected to screening and 97.0% was larger than 14 mesh (Tyler Screen Series). The complete screen analysis was as follows: +4 mesh 0.8%, +6 mesh 15.8%, +8 mesh 47.1%, +14 mesh 33.3%, +20 mesh 2.4%, −20 mesh 0.6%. The product was more uniformly sized and the amount of fines was reduced compared to the results from Example 1. During the prilling of the sulfur, the emission of sulfur particles with the cooling air was essentially absent which was evident from the fact that only steam emitted from the top of the tower.

EXAMPLE 3

Claus Process sulfur was prilled using the same conditions as in Example 2, but the basket was vibrated with a frequency of one cycle per second. No interruptions in the flow of molten sulfur were observed and operation was continuously maintained. The sulfur recovered from the bottom of the prilling tower was subjected to screening and 96.1% was larger than 14 mesh (Tyler Screen Series). The complete screen analysis was as follows:

+4 mesh 2.8%, +6 mesh 29.6%, +8 mesh 31.5%, +14 mesh 32.2%, +20 mesh 2.6%, −1.3%. The product was more uniformly sized and the amount of fines was reduced compared to the results from Example 1. During the prilling of the sulfur, the emission of sulfur particles with the cooling air was essentially absent which was evident from the fact that only steam emitted from the top of the tower.

SULFUR GRANULATION

In the granulation of sulfur, a bed of moving solid particles of sulfur is formed and maintained in a rotating, horizontally elongated contact zone. Finely divided solid particles are added to the bed and are advanced through the contact zone. Solid particles are continuously raised from the bed to the upper region of the contact zone and the raised particles are subsequently released and allowed to cascade downwardly through the contact zone onto the bed as a continuous curtain of solid sulfur particles. The curtain of falling particles extends substantially the length of the contact zone. Molten sulfur obtained from a source of molten sulfur is sprayed from spray means, which is vibrated at a low frequency, onto the bed and into the curtain of solid particles which causes wetting and coating of the sulfur particles with molten sulfur and causes an increase in the size of these particles. The coated particles are passed to a cooling zone. A current of a suitable cooling gas is passed through the cooling zone and the contact zone countercurrent to the direction of advance of the sulfur particles. Sulfur granules are subsequently discharged from the cooling zone and subjected to a separation from which sulfur granules within a predetermined size range are recovered as product. The oversize fraction is reduced in size and returned with the undersize fraction to the contact zone.

The elongated contact zone is preferably an elongated granulation drum mounted for rotation about its longitudinal axis, which is slightly inclined to the horizontal, as disclosed in U.S. Pat. No. 4,234,318, incorporated herein by reference. The inside wall of the granulator is equipped with lifting elements, which are circumferentially spaced and substantially extend the length of the granulator. If desired, deflecting means may be used in the granulator to deflect a portion of the particles falling from the lifting elements to create a separate, second curtain of falling particles.

The spray means comprises at least one orifice and may consist of either a single spray nozzle or a multiplicity of spray nozzles, each nozzle mounted on a spray head attached to a spray header. The spray means, connected to the source of molten sulfur, extends the length of the contact zone. Molten sulfur is sprayed from the spray nozzle or nozzles under controlled conditions to obtain proper dispersion and distribution of the molten sulfur and coating of the sulfur particles of the bed and of the cascading, falling particles. The molten sulfur is usually at a temperature in the range of 119° to 159° C. and molten sulfur is sprayed at a temperature within the range of about one to 40, preferably 5 to 30, Celcius degrees above the sulfur melting temperature and at a pressure of at least about 100 kPa. The spray pressure is preferably in the range of about 100 to 400 kPa, although pressures as high as 4000 kPa may be used. When using pressures in the preferred range, the formation of very fine sulfur particles or dust is substantially prevented. Such dust is generally difficult to handle and control and may cause undesirable sulfur emission from the process.

Each spray nozzle is vibrated at a low frequency using suitable vibrating means. Preferably, means for generating vibration is mounted on or close to a spray nozzle in such a manner that vibration is preferably generated in the direction of the flow of molten sulfur through the spray nozzle. When a sprayheader with spray heads and nozzles is used, a vibrating means is mounted on each spray head close to the corresponding nozzle. The means for vibrating can be any suitable means known in the art and is chosen such that its mass is proportional to the mass of the spray means and its contents. A frequency in the range of about 0.2 to 30 cycles per second, preferably 0.5 to 10 cycles per second, has been found adequate to prevent any interruption in flow and to ensure a uniform, steady rate of flow of molten sulfur from the spray means. The vibration also reduces the formation of very small dust particles of sulfur which may create emission of sulfur from the process.

The coated sulfur particles pass from the contact zone into a cooling zone. A cooling zone may either be contained within the granulator drum and separated from the contact zone by an upstanding retaining ring, or be a separate elongated drum mounted for rotation about its longitudinal axis which is slightly inclined to the horizontal. Such cooling zone is equipped with circumferentially spaced lifting elements extending substantially the length of the zone. Alternatively, a separate cooling zone could comprise a vessel for fluidizing or spouting a bed of granules with a countercurrent flow of cooling gas.

Cooling gas flows countercurrent to the direction of the advance of the particles through the contact zone and the cooling zone. The cooling gas may be air or, if desired, may be a substantially inert gas such as carbon dioxide or nitrogen or a mixture of gases containing not more than about 8% oxygen by volume. If a substantially inert cooling gas is used, the gas is preferably circulated in a closed gas system, the system including essentially all equipment used in the process.

The temperature of the cooling gas entering the contact zone must be well below the temperature of the molten sulfur and is preferably close to ambient temperature. Cooling gas temperatures in the range of 10° to 50° C. are preferred. If necessary, the cooling gas or a portion thereof may be cooled in a separate cooling device. The flow and temperature of cooling gas is controlled to provide the cooling necessary to solidify the wet coatings on the sulfur particles in time to avoid agglomeration of particles and to avoid formation of amorphous sulfur. If desired, cooling in part may also be provided in the contact zone by spraying a controlled amount of water on sulfur particles, for example, on cascading sulfur particles falling in a curtain.

Sulfur particles which discharge from the cooling zone are transferred to a screen unit for separation into a product-size fraction, an oversize fraction and an undersize fraction. The size fraction in a particle size range of −4 to +14 mesh (Tyler Screen Series), preferably −4 to +10, mesh is withdrawn as product. The oversize fraction is reduced in size and, together with the undersize fraction and any fines collected in other parts of the process, is returned to the contact zone. The ratio of recycle fines to produce sulfur is usually maintained in the range of 4:1 to 1.5:1.

The following example illustrates the operation of a granulation process in the production of granular sulfur.

EXAMPLE 4

A granulation process operated to produce 500 metric tonnes (t) per day of granulated sulfur has 1000 t/day sulfur fines fed to a drum granulator having a diameter of 3.6 m containing a bed of moving solid particles of sulfur and consisting of a 6 m long contact zone and a 6 m long cooling zone. The contact zone is separated from the cooling zone by an upstanding retaining ring. The granulator is positioned under an inclination of 3 cm/m and rotated at 10 rpm. Lifting elements in the rotating granulator cause formation of a cascading curtain of sulfur particles.

Molten sulfur is sprayed through four spray nozzles attached to spray heads mounted on a spray header extending substantially the length of the contact zone. The sulfur is sprayed at a temperature of 130° C. and under a pressure of 400kPa. A vibrator is mounted on each spray head close to the spray nozzle such that the spray nozzle is subjected to vibration in the direction of the flow of sulfur through the spray heads and nozzles. The nozzles are vibrated at a frequency of 10 cycles per second.

Cooling air is supplied to the outlet of the granulator at a rate of 46000 normal m³/h and at a temperature of 30° C. Granulated sulfur passes from the contact zone to the cooling zone and is discharged from the cooling zone at a temperature of 50° C. Cooling gas discharging from the contact zone at 90° is treated for the separation of fines and subsequently discharged from the process.

Granulated sulfur from the cooling zone is screened to yield 500 t/day of product sulfur having particle sizes in the range of −4 to +10 mesh (Tyler Screen Series). The oversize is crushed, combined with the undersize and fines for a total amount of 1000 t/day and recycled to the contact zone in the granulator at a recycle fines to sulfur product ratio of 2:1.

The process operates continuously and without interruptions in the flow of molten sulfur from the spray nozzles. Emission of sulfur particles in the cooling air discharging from the process is essentially absent.

It will be understood that modifications can be made in the embodiments of the invention described and illustrated herein without departing from the scope and purview of the invention as defined in the appended claims.

What I claim as new and desire to protect by Letters Patent of the United States is:

1. A process for the manufacture of particulate sulfur wherein molten sulfur is fed to spray means from which said molten sulfur emanates as a spray of molten sulfur, and said spray is formed into particulate solid sulfur, said process comprising feeding molten sulfur to said spray means at a temperature at least one Celcius degree above the melting temperature of sulfur, said spray means having at least one orifice; forming a spray of molten sulfur at said orifice; vibrating said spray means at a frequency in the range of about 0.2 to 30 cycles per second; forming said spray of molten sulfur into hard spherical particulate sulfur in a current of cooling gas; and recovering said particulate sulfur, whereby the flow of molten sulfur through the orifice is maintained at a uniform, steady rate of flow.

2. A process as claimed in claim 1, wherein the spray means are vibrated in the direction of the flow of molten sulfur through the orifice.

3. A process for the prilling of sulfur wherein molten sulfur is fed to spray means comprising a prilling device at the top of a prilling tower, droplets of molten sulfur emanating from the prilling device are solidified in a rising stream of cooling air and solidified sulfur droplets are discharged from the tower, said process comprising feeding molten sulfur at a temperature in the range of from about one to about seven Celcius degrees above the melting temperature of sulfur to said prilling device, said prilling device having at least one orifice; forming drops of molten sulfur at said orifice; vibrating said prilling device at a frequency in the range of about 0.2 to 30 cycles per second; solidifying said drops of molten sulfur in said rising stream of cooling air in the form of hard, spherical, uniformly sized sulfur prills; discharging said sulfur prills from the bottom of the tower; and discharging cooling air from the top of the tower; whereby the flow of molten sulfur through the orifice is maintained at a uniform, steady rate of flow and the formation of fine droplets smaller than said drops is substantially obviated, such that the amount of solidified fine droplets contained with the discharged sulfur prills and the emission of solidified fine droplets of sulfur entrained with the discharging cooling air are substantially reduced.

4. A process as claimed in claim 3, wherein the spray means are vibrated in the direction of the flow of molten sulfur through the orifice.

5. A process as claimed in claim 3, wherein the temperature of the molten sulfur and the temperature of the prilling device are maintained in the range of from about 120° C. to about 125° C. and the prilling device is vibrated with a frequency in the range of about 0.5 to 10 cycles per second.

6. A process as claimed in claim 3, 4 or 5, wherein the prilling device is vibrated with a frequency of about one cycle per second.

7. A process as claimed in claim 3, 4 or 5, wherein the prilling device has a multiplicity of orifices and the prilling device is heated to a temperature about one to two Celcius degrees higher than the temperature of the molten sulfur.

8. A process as claimed in claim 3, wherein the molten sulfur is fed to the prilling device at a pressure within the range of 250 to 1000 Pa and at a temperature in the range of from about 120° to 125° C., and said prilling device has a multiplicity of orifices.

9. A process as claimed in claim 8, wherein the prilling device is heated to a temperature about one to two Celcius degrees higher than the temperature of the molten sulfur.

10. A process as claimed in claim 8 or 9, wherein the molten sulfur is fed to the prilling device at a temperature of 121° C., the prilling device is heated to a temperature of 122° C. and is vibrated with a frequency of about one cycle per second, and the cooling air has an upward velocity of 6 m/sec at a temperature of 32° C.

11. A process as claimed in claim 8 or 9, wherein the molten sulfur is fed to the prilling device at a temperature of 121° C., the prilling device is heated to a temperature of 122° C. and is vibrated with a frequency of about eight cycles per second, and the cooling air has an upward velocity of 6 m/sec at a temperature of 32° C.

12. A process for the production of granular sulfur which comprises forming a bed of moving solid particles of sulfur; spraying molten sulfur from a spray means having at least one orifice at a temperature of from about 1 to about 40 Celsius degrees above the melting temperature of sulfur and at a spray pressure of at least 100 kPa onto said bed and into a continuously falling curtain of said solid particles; simultaneously contacting the continuously falling curtain of solid particles with a current of cooling air; and vibrating said spray means at a frequency in the range of about 0.2 to 30 cycles per second, such that vibration is imparted in the direction of flow of molten sulfur through said orifice; whereby the flow of molten sulfur through said spray means is maintained at a uniform, steady rate of flow.

13. A process for producing granular sulfur which comprises the steps of forming and maintaining a continuously cascading curtain of solid particles of sulfur extending substantially the length of a rotating vessel having a horizontally elongated contact zone; advancing said particles through said contact zone; spraying molten sulfur from a spray means having at least one orifice at a spray pressure in the range of about 100 to 400 kPa and at a temperature in the range of about 5 to 30 Celsius degrees above the sulfur melting temperature onto said bed and into said curtain of said solid particles in said contact zone; simultaneously contacting said curtain with a current of a cooling gas flowing countercurrently to the direction of the advance of said particles; vibrating said spray means at a frequency in the range of about 0.2 to 30 cycles per second, such that vibration is imparted in the direction of the flow of molten sulfur through said orifice, whereby the flow of molten sulfur through said spray means is maintained at a uniform, steady rate of flow; continuously passing said solid particles from said contact zone to a cooling zone; advancing said solid particles through said cooling zone; simultaneously cooling the particles advancing through said contact zone and said cooling zone by contacting with a current of cooling gas flowing countercurrently to the direction of advance of said particles; withdrawing cooled solid particles within a predetermined size range from said cooling zone; separating cooled solid particles within a predetermined size range from said withdrawn cooled solid particles as product granules; and recycling cooled solid particles smaller than those within said predetermined size range as finely divided particles of sulfur to said contact zone at ratios of finely divided particles to product granules in the range of about 4:1 to about 1.5:1.

14. A process as claimed in claim 1, 12 or 13, wherein the spray means is vibrated with a frequency in the range of about 0.5 to 10 cycles per second.

15. A process as claimed in claim 1, 12 or 13, wherein the spray means consists of a spray header including at least one spray nozzle, said spray nozzle being vibrated at a frequency in the range of about 0.5 to 10 cycles per second.

16. A process as claimed in claim 1, 12 or 13, wherein the spray means comprises a multiplicity of spray nozzles.

17. A process as claimed in claim 1 or 12, wherein the temperature of the sulfur fed to the spray means is in the range of from about 5 to about 30 Celsius degrees above the melting temperature of sulfur.

18. A process as claimed in claim 1, 12 or 13, wherein the spray means is heated to a temperature about one to five Celcius degrees higher than the temperature of the molten sulfur.

19. A process as claimed in claim 1, 2 or 13, wherein the cooling gas is air, a substantially inert gas or a mixture of gases containing no more than about 8% oxygen by volume.

* * * * *